Dec. 7, 1937. P. G. HEINEMAN Re. 20,571
MEDICAMENT PACKAGE AND PROCESS
Original Filed Sept. 26, 1927
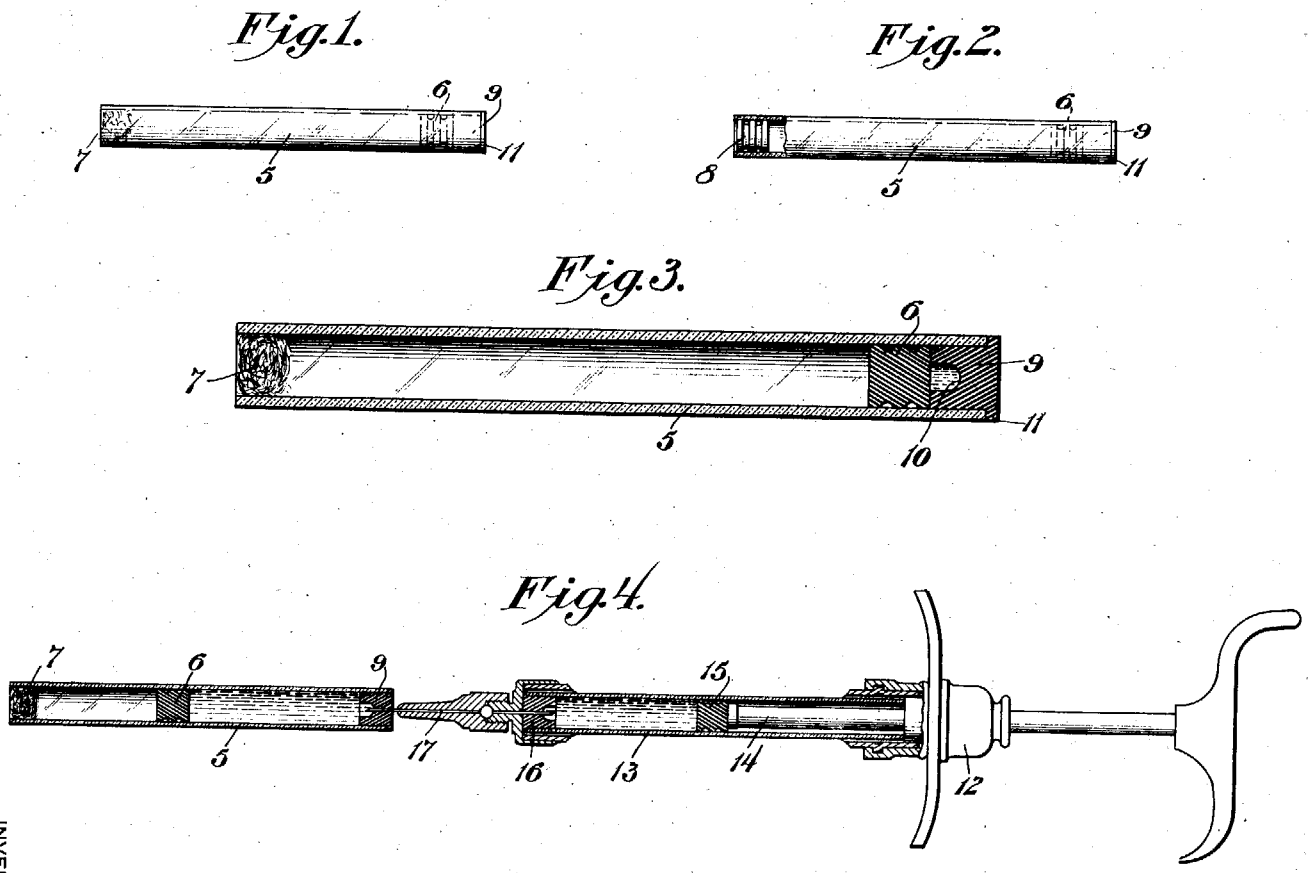
INVENTOR
Paul G. Heineman
BY
Philip E. Siggers,
ATTORNEY Reissued Dec. 7, 1937

Re. 20,571

UNITED STATES PATENT OFFICE 20,571

MEDICAMENT PACKAGE AND PROCESS

Paul G. Heineman, Albany, N. Y., assignor to Cook Laboratories, Inc., Chicago, Ill., a corporation of Delaware Original No. 1,967,439, dated July 24, 1934, Serial No. 222,150, filed September 26, 1927. Renewed December 7, 1933. Application for reissue July 24, 1936, Serial No. 92,394

7 Claims. (Cl. 128—218)

This invention relates to medicament packages, and processes of preparing the same for use; and among other objects aims to provide a sealed, aseptic medicament container so constructed and arranged that it may be used to carry a concentrated but unstable medicament which by the improved process is diluted, without contamination, immediately before use. The invention is particularly useful in the preparation of medicaments for hypodermic injections, for example, the medicament used in the Schick test for immunity from diphtheria. This medicament is in liquid form. The new package, however, is not only useful for medicaments in liquid, but also for such in solid form. As examples, a novocain buffer mixture, or neoarsphenamine, or the alkali salts of barbituric acids, in general, solid substances which in aqueous solutions are stable only for a short period of time, may be mentioned.

In the accompanying drawing showing two embodiments of the improved package, and also instrumentalities by which the process may be carried out,—

Fig. 1 is an elevation of a medicament container embodying the invention;

Fig. 2 is a similar view of a slightly modified form, with parts of the wall broken away;

Fig. 3 is an enlarged longitudinal section of the form of invention shown in Fig. 1; and Fig. 4 is a sectional view on the scale of Fig. 1 showing the preferred means by which the process is practiced.

Referring more specifically to the drawing, there is shown in Figs. 1 and 3 a medicament container comprising a body 5 formed, for example, from a section of a glass tube sealed near one end by a slidable rubber plug 6 and at the other end by a wad of cotton wool 7. The embodiment of the invention illustrated in Fig. 2 differs only in the substitution of a slidable rubber plug 8 (like plug 6) for the wad of cotton wool 7. The containers of Figs. 2 and 3 are both empty between the slidable plug 6 and the closure 7 or 8, except for sterile air. However, adjacent to the plug 6 is another rubber plug 9 which is inserted in the end of tube 5 and which has a cavity 10 opening interiorly and containing a small quantity of concentrated medicament of a character which, if diluted, would be unstable and hence make the package unmarketable.

It will be clear from Fig. 3 that the plug 6, in conjunction with the cavity 10 in plug 9, provides a sealed chamber of small capacity, whose walls are wholly of rubber thus preserving the concentrated medicament out of contact with the glass walls of the tube 5.

The described medicament package may be prepared by inserting the rubber plugs 6 and 9 into one end of the cleansed tube 5, the plug 6 preceding the plug 9, and then sterilizing the tube containing the two plugs. Immediately after sterilization, the wad of cotton wool 7 (or another plug closure 8) is inserted into the other end of the tube so as to obviate the possibility of contamination entering through that end. A second sterilization may then be resorted to. The empty packages may be immediately filled or may be stored until filling is convenient, without the possibility of contamination entering the space between the plugs 6 and 7 or the closed chamber 10 provided by the abutted plugs 6, 9.

When it is desired to fill the chamber 10, a thin filling needle (not shown) having two bores, one connected with a source of vacuum and the other with a supply of medicament, may be thrust axially through the body of the plug 9, the end of such needle penetrating only as far as the cavity and being withheld from entering the plug 6 which would seat it. The plug 9, as shown, is mechanically interlocked with the end of the tube 5, for example, by means of a flange 11 which fits against the end of the tube, preventing inward movement of the plug 9 when pierced by the filling instrumentality. As soon as the end of the filling needle enters the cavity 10, the air in the cavity will be exhausted and the cavity will be filled with the concentrated medicament which it is desired to preserve in the package. The packages may now be prepared for the market and may be stored for considerable periods of time without deterioration of their contents. Obviously, other filling methods may be employed.

In order to prepare the package for use, its contents must be diluted with or dissolved by a medicament of predetermined volume, whose sterility must not be impaired by the diluting step. According to old practice, dilution of concentrated medicaments has been effected by pouring such medicaments into open vessels (which are exposed to the atmosphere and all that it contains) and then mixing in the diluting agent, whose volume has been measured more or less imperfectly by the practitioner. Then the solution thus prepared is usually boiled to sterilize it, and is then poured into a syringe for hypodermic or other administration. Such methods are unsafe because of the possibility of contamination even after boiling, not only from the impurities present in the atmosphere itself but also from the syringe and from the handling or clost contact of the practitioner. Furthermore, the boiling after mixing inevitably reduces the volume of the medicament and there is always some loss due to evaporation and incident upon pouring and repouring from one vessel to another. Thus there is waste of the medicament to be administered and there is an inevitable variation in its concentration and volume, as well as loss of time which may be most valuable to the practitioner. Moreover, in some instances, boiling cannot be resorted to because this would decompose the medicament to be administered. The above procedure and others known to the medical and dental professions are eliminated by the improved process hereinafter described and claimed.

Referring to Fig. 4 there is shown a syringe 12 carrying a medicament package 13 which contains a diluting agent especially prepared for diluting the particular concentrated medicament in the package 5. The syringe 12 includes a slidable plunger 14 which engages the slidable plug 15 of the medicament package 13, the other end of the package being closed by a plug 16 constructed like the plug 9 of the package shown in Fig. 3 and being pierced by a hollow double-pointed needle 17 carried by the forward end of the syringe.

In order to transfer the contents of package 13 to the interior of package 5 without contamination or loss, it is only necessary to introduce the end of the needle 17 into the cavity 10 by piercing the wall of the plug 9 axially, as shown in the drawing and then to push the plunger 14 inwardly. This slides the plug 15 toward the forward end of the syringe 12 causing the medicament to flow through the bore of needle 17 into the space between plugs 6 and 9. As plug 9 is not movable, while plug 6 is readily slidable, the latter slides outwardly at the same rate as plug 15 is moved by the plunger 14. The sterile air in the container 5 between plugs 6 and 7 is pushed out past the cotton plug 7 and through the interstices thereof. If the transfer is made rapidly, the air might become compressed somewhat, in which event it will blow out the plug 7 (or the plug 8, as the case may be); but the plug 6 immediately closes the tube 5 because it is moved to the end of the tube as fast as the plug 15 is moved toward plug 16. It will be noted that as the plug 6 hermetically seals the container, no air which may momentarily enter the container when the sealing plug 7, 8 is blown out, can contaminate the diluted medicament in the package 5.

It will be clear that the plugs 6 and 9 need not be abutted against each other if the medicament to be packaged is stable in contact with glass, and if it is of such volume as to exceed the capacity of the cavity provided by plug 9. Furthermore, it will be evident that no air can enter the space between the plugs 6 and 9, if the piercing operation is performed properly. Once the concentrated medicament is diluted or dissolved, the package 5 may be immediately used for an injection, or series of injections.

Obviously the invention may be embodied in packages having other forms than the two shown; and the process may be carried out by means of other apparatus than the illustrative instrument described above.

What I claim is:—

1. An aseptic package for concentrated medicaments which is particularly adapted to facilitate dilution of the contents thereof without contact with the air, comprising, in combination, a glass tube; a resilient plug inserted in the tube at one end and having a cavity opening interiorly and being constructed and arranged so that inward movement thereof through the tube is prevented; and another resilient plug adjacent the plug having the cavity and so constructed and arranged that it forms a closed, sterile chamber within the tube, in conjunction with the other plug; said abutted plug being freely slidable through the tube.

2. A medicament package comprising, in combination, a rigid tube open at both ends; a temporary seal at one end which is capable of being forced out by pressure from within; a pierceable, resilient plug sealing the other end and immovable toward the end having the temporary seal; and a resilient, slidable plug adjacent the pierceable plug and movable by hydrostatic pressure through the tube to the other end; there being a small chamber confined between the pierceable plug and the slidable plug which may contain a small volume of concentrated medicament.

3. A medicament package comprising, in combination, a rigid tube open at both ends; a pierceable resilient plug sealing one end; and a resilient, slidable plug adjacent the pierceable plug and movable by hydrostatic pressure through the tube to the other end; there being a small chamber confined between the pierceable plug and the slidable plug which contains a small volume of concentrated medicament.

4. A process of preparing for immediate use medicament packages containing concentrated medicament which must be diluted or dissolved before use, comprising piercing a wall of the package containing the concentrated medicament with a piercing medium of small diameter, and preventing the entrance of air therein; and employing hydrostatic pressure created within another package containing the solvent or diluting agent to transfer the solvent or diluting agent directly into the package containing the concentrated medicament without contact with the air, and also to push back a wall of said package to expand its volume sufficiently to contain the diluted or dissolved medicament.

5. A process of preparing packages of medicaments which are unstable when diluted, comprising, first, preparing a package having a passageway therein with two substantially juxtaposed plugs closing one end, the plugs being so arranged that a sealed space of small volume is provided between them and being relatively movable; then injecting into said space medicament which must be diluted before use, and which is sufficiently concentrated to be relatively quite stable; and then, just before the medicament is to be used, injecting into said space, under pressure, a solvent or diluting agent sufficient in volume to make a correct solution after it has mixed with the concentrated medicament; the injection under pressure of the diluting agent separating the two initially juxtaposed plugs to provide a sealed chamber for the diluted or dissolved medicament, thus obviating contact of the medicament with the atmosphere either during or after the dilution or dissolution.

6. A process of preparing packages of medicaments which are unstable when diluted, comprising, first, preparing a package having a passageway therein with two substantially juxtaposed plugs closing one end, the plugs being so arranged that a sealed space of small volume is provided between them and being relatively movable; then injecting into said space medicament which must be diluted before use, and which is sufficiently concentrated to be relatively quite stable; preparing a second package containing a solvent or diluting agent for the concentrated medicament in the first package, said solvent or diluting agent being confined between two resilient closures, one of which is slidable end to end of the package; piercing the two closures of respective packages, which closures are designed not to be moved, by means of a canula; and transferring the solvent or diluting agent from the second package to the first through said canula, the discharge end of which is initially placed within the space between the two juxtaposed plugs of the first package.

7. An aseptic package for medicaments which is particularly adapted to facilitate a dilution of the contents thereof without contact with the air which comprises, in combination, a glass tube, a resilient plug inserted in the tube at one end and having a cavity opening interiorly and being constructed and arranged so that inward movement thereof through the tube is prevented; and another pierceable resilient plug substantially adjacent to the plug having the cavity and so constructed and arranged that it forms a closed, sterile chamber within the tube, in conjunction with the first plug, which chamber exceeds in volume the capacity of the cavity provided by the first plug, said second plug being freely slidable through the tube.

PAUL G. HEINEMAN.